Nov. 6, 1956

A. BOUWERS 2,769,373

OPTICAL REFLECTING ANAMORPHOTIC DEVICE
FOR USE WITH OBJECTIVE LENS SYSTEMS

Filed Jan. 22, 1954

INVENTOR.
Albert Bouwers
BY
Wenderoth, Lind & Ponack
ATTYS.

Nov. 6, 1956

A. BOUWERS

2,769,373

OPTICAL REFLECTING ANAMORPHOTIC DEVICE
FOR USE WITH OBJECTIVE LENS SYSTEMS

Filed Jan. 22, 1954

INVENTOR.
ALBERT BOUWERS
BY
ATTYS.

United States Patent Office 2,769,373
Patented Nov. 6, 1956

2,769,373

OPTICAL REFLECTING ANAMORPHOTIC DEVICE FOR USE WITH OBJECTIVE LENS SYSTEMS

Albert Bouwers, The Hague, Netherlands, assignor to N. V. Optische Industrie "de Oude Delft," Delft, Netherlands Application January 22, 1954, Serial No. 405,550

Claims priority, application Netherlands June 10, 1953

29 Claims. (Cl. 88—57)

The invention refers to an optical system for the production of anamorphotic images, characterized in that the ratio of the lengthwise dimensions to the breadthwise dimensions is different from that in the object itself. Such optical systems are already known and consist of combinations of positive and negative cylindrical lenses which are difficult to manufacture.

In order that the image may be as faultless as possible, these cylindrical lenses are composed of several elements as a result of which their production and adjustment are rendered still more difficult. Compare for instance U. S. Patent No. 1,962,892. Moreover, the designers have not succeeded in devising the optical system in such a way that aberrations are entirely eliminated.

The object of the present invention is:
a. To diminish the difficulties of production, and
b. To improve the quality of the image.

This is achieved by means of mirrors in conjunction with a camera objective or projection lens to which has been added a system comprising a convex and a concave toric or cylindrical mirror with substantially parallel axes which are dimensioned and positioned in such a manner that a parallel beam of circular cross-section incident on this system is converted into a substantially parallel beam of elliptical cross-section. This can be easily realized by arranging the convex and the concave mirror surfaces in such a way that the shortest distance between these surfaces is approximately equal to half the difference between the radii of the mirrors. In other words, the focal lines of the two mirrors are approximately coincident. However, strictly parallelism of the emergent beam conjugated to an incident parallel beam is of course not required. It has been proposed already in British Patent No. 354,843 to apply a system of cylindrical mirrors. However, this system produces images afflicted with strong astigmatism, as the essential requirement in the present invention, i. e. the coincidence of the two focal lines is not realised therein.

It is recommended in the invention that the mirrors be made cylindrical, although in special cases the purpose may be served by the use of toric mirror surfaces or any other suitable surface of revolution. Under "coincidence of focal lines" is understood that the focal line of focal lines produced by the first mirror for a parallel or convergent or divergent beam is (are) approximately coincident with that (those) of the second mirror so that the beams emergent from the second mirror are substantially anastigmatic.

The anamorphotic effect of the system may be expressed by the ratio between the long and the short axis of the elliptical cross-section of the emerging beam. By the invention this effect is obtained with extremely simple means, a fact that is at once obvious when the system as in the invention is compared, for instance, with that described in the American Patent No. 1,962,892. In the system described therein it is necessary to grind and polish 10 cylindrical surfaces as against 2 only in the system according to the invention. Moreover, the latter system is strictly free of colour. The practical value of the simple construction is particularly marked in view of the fact that the adjustment of a multiple cylindrical lens becomes very difficult according as the number of components is increased.

The parallel axes of the two mirrors may be positioned in different ways with respect to the optical axis of the camera objective or projection lens. Some particularly advantageous embodiments will be briefly described below.

A first embodiment of the system according to the invention shows the characteristic that the axes of the two mirrors are substantially perpendicular to the optical axes of the camera objective or projection lens. The advantage of this is that the image is free from distortion. In a preferred embodiment the angle of incidence of the chief ray of the light beam originating from the axial point of the object is smaller than 30°. Thus the spherical aberration is very small.

Another highly advantageous embodiment is that in which the axes of the two mirrors and the optical axis of the camera objective or projection lens are situated substantially in one plane. The advantage of this is that a very large field of view is obtainable and more particularly so in the direction of the greatest length of the image. In addition the spherical aberration is highly corrected and moreover the other aberrations are favorably influenced, due to the small angles of incidence on the mirrors. This point will be explained in detail hereinafter with reference to the drawings. A further advantage of this embodiment of the system according to the invention is that it produces a disortion of the image in such a way that when used for projection horizontal straight lines in the object are projected as horizontal curved lines turning their concave side downwards. This distortion being opposite to that which naturally occurs when projection is carried out in an auditorium in which the cabin is higher than the centre of the curved projection screen, this second embodiment provides compensation for distortion.

According to a further characteristic of the system according to the invention, at least one of the mirrors is rotatably mounted. In this way three advantages are obtained.

Firstly, it is possible to avail oneself of this arrangement in order to effect optical adjustment of the whole system, a feature that is of particular importance for obtaining anastigmatic images.

Secondly, the degree of freedom of adjustment introduced in this way may be used for focusing. In the case, for instance, of cinema projection, the picture can be focused or adjusted on the screen.

For the achievement of the first-mentioned effect, viz., good adjustability, the mirrors should preferably rotate about an axis which is substantially perpendicular to the plane of the respective mirror.

For the realization of the second effect, viz., correct location of the image, it will, however, be preferable to rotate one or both mirrors about an axis situated in or being parallel to the plane of the respective mirror. As an alternative, one of the two mirrors or both of them may be made to rotate about two axes at right angles to each other and being parallel to the mirrors; in this case one rotation may shift the projected image in a horizontal direction and the other in a vertical direction.

Thirdly, one may take advantage of the degree of freedom for the purpose of modifying or compensating the distortion of the image by varying the angle of incidence of the beams on the convex or the concave mirrors, whilst the axes of these mirrors are kept substantially parallel.

In the system according to the invention the convex mirror is therefore preferably mounted in such a way that it can rotate about an axis situated approximately perpendicular to the plane containing the optical axis of the projection lens and the cylinder axes of the two mirrors. By adjustment of the angle of rotation about this axis, it is an extremely easy matter to introduce the correct amount of distortion which will exactly compensate the distortion caused by projecting the picture downwards on to a curved screen. Moreover, one and the same system can be adapted to various kinds of auditoria with different positionings of the cabin window with respect to the projection screen and with different screen curvatures.

In a preferred embodiment of the optical systm according to the invention the concave mirror also is mounted so that it can rotate, its axis of rotation being parallel to that of the convex mirror, and both axes of rotation being coupled so that the two mirrors will invariably rotate through the same angle. In this way the desired distortion is obtained without introduction of aberrations. This result can, according to the invention, also be achieved by fitting the two mirrors immovably in a holder and mounting the holder so that it can be rotated as a whole.

According to a further characteristic of the system according to the invention, the entire system, consisting of a projector with its objective and the two cylindrical mirrors, can be mounted so that it will rotate about a horizontal axis. In this way, after distortion has been compensated by rotation of one or both mirrors, the whole picture can be set at its correct location by rotating the projector together with the objective and the mirror system about the horizontal axis.

By this arrangement, the shifting of the picture which occurs during compensating of distortion is again corrected in a simple, but expedient manner.

With the above and other objects in view which will become apparent from the detailed description below, various preferred modifications of the invention are shown in the drawings, in which Fig. 4 is a diagrammatic view of a still further modification, Fig. 4a is a diagrammatic view of another modification, Fig. 5b is a bottom view of the construction shown in Fig. 5a, Fig. 6a is an open side view of a modification of the construction shown in Fig. 5a, Fig. 6b is a bottom view of the construction shown in Fig. 6a, Fig. 7 is a diagrammatic view of a still further modification of the invention illustrating a four mirror system, Fig. 9b is a top plan view illustrating a detail of the construction shown in Fig. 9a, Fig. 10 is a cross sectional view of a modification of the system wherein nearly direct vision is provided.

In the various views similar reference characters indicate like parts.

Figures 1, 2A, 2B:
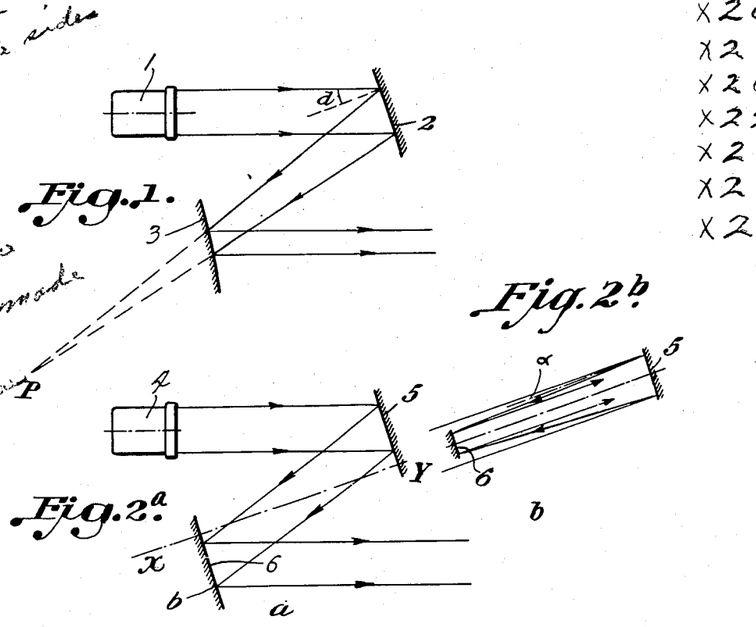
Fig. 1 is a diagrammatic view of one form of the invention.
Fig. 2a is a diagrammatic view of a modification.
Fig. 2b is a diagrammatic view of a further modification.
Figure 3:
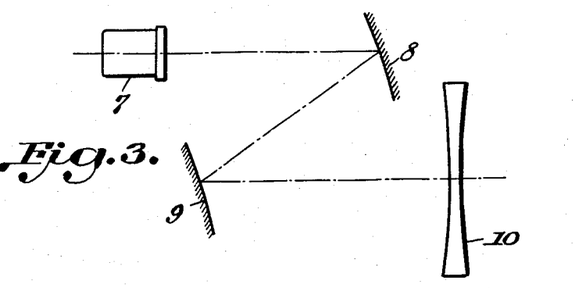
Fig. 3 is a similar diagrammatic view of a further modification.

Three first embodiments are, by way of example, shown schematically in Figures 1 to 3 inclusive in order to illustrate the main principle of the invention.

All three figures are sections of the optical systems involved.

1 in Fig. 1 is an objective, 2 a concave and 3 a convex cylindrical mirror. The straight generatrices of these two mirrors 2 and 3 are perpendicular to the plane of the drawing. A parallel beam emerging from objective 1 will, on being reflected by the concave mirror 2 in the cross-section of the drawing, converge towards line P which is situated near the focal line of the concave mirror. This convergent cylindrical beam is re-converted by reflection from the convex mirror 3 into a parallel beam, as the focal line of this convex mirror is likewise situated in the neighbourhood of P. Although in this particular example the emergent beam conjugated to the incident parallel beam is again precisely parallel small deviations from parallelism (up to about 10°) are not only tolerable but often desirable. Thus the light rays in the emergent beam conjugated to a parallel incident beam should preferably make angles of not more than 10° with the chief ray of that emergent beam. This restriction applies to all embodiments of the present invention.

By this arrangement the result is achieved that the cross-section of the emergent beam in the plane of the drawing is reduced by a certain factor. Assume in the case of Fig. 1 that it is reduced by the factor of 2, whilst in a direction perpendicular to the plane of the drawing the cross-section of the beam remains unaltered. The effect to this is that the field of view and consequently the image is enlarged by the factor of 2 in the direction situated in the plane of the drawing. In the case of application for cinema projection the plane of the drawing will thus be horizontal.

Fig. 2a shows a system consisting of the projection lens 4, the concave mirror 5 and the convex mirror 6. Fig. 2b represents the section of these mirrors with plane XY which is perpendicular to the plane of the drawing in Fig. 2a. Both mirrors are cylindrical and their generatrices are parallel to the plane of the drawing in Fig. 2a. A parallel beam with circular cross-section which is incident on mirror 5 will have an elliptical cross-section after emergence from mirror 6, the long axis being in the plane of the drawing of Fig. 2a and the short axis being perpendicular thereto. As a result of this the image is lengthened in a direction perpendicular to the plane of the drawing in Fig. 2a which plane is vertical in the case of cinema projection.

The spherical aberrations as well as most of the other aberrations are greater according as the angle of incidence $\alpha$ (see Fig. 1) of the light rays on the reflecting surfaces of the mirrors, is greater.

For instance the longitudinal spherical aberration of a single cylindrical mirror amounts to:

$$\text{Spher. long. aberr.} = f(1 - 1/\cos \alpha)$$

wherein $f$ = focal length, and $\alpha$ = angle of incidence of the ray under consideration. From this formula it appears that for small values of $\alpha$ and consequently values of $\cos \alpha$ which are approaching rapidly to 1, the longitudinal spherical aberration becomes negligible.

Now it is seen from Fig. 2a that the system represented therein has the advantage over that in Fig. 1 in that the angle of incidence $\alpha$ is remarkably small. This follows immediately from Fig. 2b. As far as the aberrations is concerned the system of Fig. 2a can be considered as having rotational symmetry, whereas the system of Fig. 1 is an asymmetrical off-axis arrangement.

Fig. 3 shows a system analogous to that of Fig. 1 and consisting of an objective (or projection lens) 7 and two cylindrical mirrors 8 and 9. Added to this system is a negative lens 10 which enlarges the size of the image as a whole. In this case a convergent beam emerging from the projection lens 7 is converted by the two mirrors 8 and 9 into a similarly convergent beam of elliptical cross-section which is approximately directed towards the focus of the negative lens 10. The beam emerging from the latter is then substantially parallel or slightly convergent so as to produce an image at some distance, for example the projection screen in a cinema.

The embodiments described are designed particularly with a view to projection of a film picture in respect of which the approximately parallel beam emerging from the projection lens originates from the axial point of the film picture, the emergent beams being directed on to the centre of the projection screen.

However, these systems can of course also be employed for anamorphotic photography, with the difference that in this case the path of the rays is reversed.

Furthermore, it is possible to make the positions of the concave and convex mirrors the reverse of those shown in Figs. 1–3.

The application of systems as in the invention, whether consisting of two or, as will be discussed later, four mirrors, is furthermore by no means confined to cinema photography and projection. With the aid of a system of this kind it is possible, for instance, with an ordinary camera objective, to double the image angle in one direction, so that an objective of, say, $f=35$ mm. in conjunction with a picture size of 24 x 36 mm. and hence an image angle of approximately $2 \times 27° = 54°$ (taken in the 36 mm. direction) will give a picture size 24 x 72 mm., corresponding to an image angle of over $2 \times 45° = 90°$.

A further object of the invention is the elimination of the parallel shift of the beam which occurs with the systems described in Figs. 1–3. In fact in Fig. 1 where the plane of the drawing is horizontal there appears to be a horizontal shift whereas in Fig. 2 where the plane of the drawing is vertical the parallel shift is in the vertical direction. The elimination of this parallel shift is of particular importance in the case of application of the system for cinema projection, because, with the existing types of projection cabins and projectors, there is often no possibility of moving the projector upward or downward to a sufficient extent to enable the emergent beams to pass entirely through the cabin window. Thus an enlargement of the cabin window is required, which would be a handicap on account of the heavy expenditure it would entail in view of the high technical standards stipulated by fire regulations for windows of this type.

The parallel shift to which reference has been made is, moreover, also undesirable in the case of cameras for the taking of film scenes, owning to the parallax which occurs with objects not infinitely remote.

According to the invention, the parallel shift of beams of light can in the first place be eliminated by the employment of a system of two plane mirrors.

According to the invention, these plane mirrors should preferably be positioned in the path of the rays between the projection lens (or the objective of the film camera) and the system of convex or concave cylindrical mirrors.

The two plane mirrors may, if desired, be formed by two lateral faces of a rhombohedral prism, which offers advantages from the point of view of manufacture and adjustment.

Another advantageous embodiment is that in which the plane mirrors are positioned in the path of the rays between the system of convex and concave mirror and the projection screen (or the object when photography instead of projection is aimed at).

Figures 4, 4A, 9A, 9B:
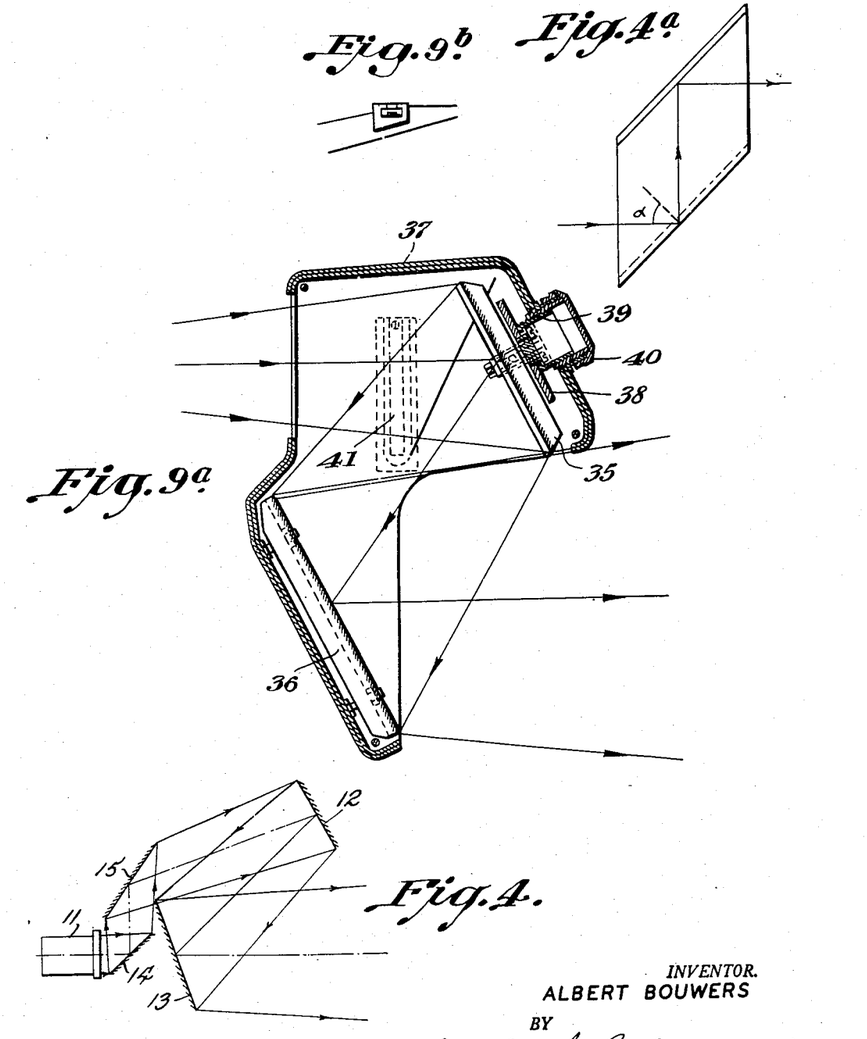

Fig. 4 shows, in cross section, the optical scheme for an embodiment of the system with two plane mirrors.

Mounted in front of the projection lens 11 are the concave cylindrical mirror 12 and the convex cylindrical mirror 13, thus forming a system corresponding exactly to that of Fig. 2.

However, in the path of the rays between the projection lens 11 and the concave cylindrical mirror 12 there are now two plane mirrors 14 and 15 by means of which the beams are given the same parallel shift as is produced by the cylindrical mirrors 12 and 13, but in the opposite direction. The result is, therefore that this parallel shift is totally eliminated, with all the advantages that this entails.

An alternative method, according to the invention, of obviating or reducing parallel shift is by adding to the two-mirror system already described a second system of analogous pattern.

In this way, moreover, two further advantages are obtained.

First, the distortion caused by a single system of mirrors is partly neutralized by the second system if the two systems are optically identical with each other. Thus two identical systems may be used if a certain percentage of distortion is desired, as in the case mentioned hereinbefore of projection in an auditorium in which the cabin is higher than the centre of the curved screen. It is also possible to combine two different systems which together give a distortion-free image. This embodiment is particularly advantageous in those cases where the projection angle is relatively small, for in the case of considerable projection angles it is preferable to make use of the great distortion of a single system.

If, according to the invention, one or more mirrors are made adjustable with respect to the others, the distortion produced by one and the same system can be adjusted to different values. This point will be further dealt with later on.

Second, the advantage is afforded that the desired anamorphotic effect is distributed over two systems, so that each individual system has less work to perform which means that weaker mirrors may be used. As a result, aberrations are reduced and the picture has a greater sharpness of definition.

An advantageous embodiment of the direct vision combination is obtained by positioning the mirrors at an angle of about 45°.

In a further advantageous embodiment of the optical system according to the invention one or more mirrors are ground on the hypotenuse faces of prisms. It is recommended in this case that the hypotenuse faces be so positioned that the effective light rays are totally reflected.

Figure 7:
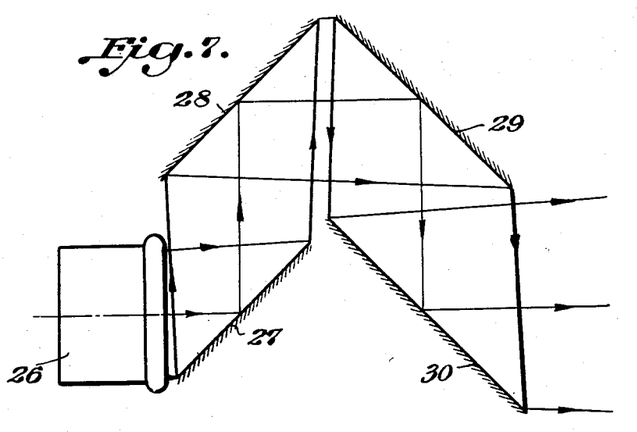

An embodiment of the four-mirror system just described, is by way of example, outlined in Fig. 7. The plane of the drawing is considered to be vertical. In front of the objective 26 with focal length $f=50$ mm. belonging to the lens system of a 16 mm. film camera or projector, the cylindrical mirrors 27, 28, 29 and 30 are located in the arrangement shown in the drawing. The axes of these mirrors are situated in practically one and the same plane as the optical axis of the objective. Mirrors 27 and 29 are concave and have a radius of curavture or 280 mm., whilst the convex mirrors 28 and 30 have a radius of curvature of 200 mm. The distance between mirrors 27 and 28 and between mirrors 29 and 30 is 40 mm., measured along the chief ray of the beam which corresponds to the axial point of the object. Each of the mirror systems gives a widening of the picture in a horizontal direction by a factor of 1.4 so that in total an approximately twofold widening is obtained.

There is residual distortion which compensates the distortion resulting from projecting downwards under an angle of 12°. Moreover, the sharpness of definition of the picture is very good, as the already small loss of definition given by systems with only two mirrors is further reduced because the anamorphotic effect of each single system is small (factor 1.4), whereas the combination nevertheless has an anamorphotic factor of 2.

Moreover, the entire system is with direct vision (without parallel shift).

The mirrors 27, 28, 29 and 30 shown in the drawing may if desired, be replaced entirely or partly by 45° prisms the hypotenuse faces of which have been ground cylindrically so that they possess the above mentioned radii of curvature. Furthermore, if the refractive index $n$ is at least 1.6, these cylindrical faces need not be provided with a reflecting layer, as total reflection will occur. Thus greater simplicity is obtained as well as 100% reflection. A further advantage of prisms is that the angles in glass are reduced by a factor of $n$, so that vignetting is reduced and the total dimensions of the system are smaller.

A further advantage of glass prisms is the reduction of the distortion with a factor $n$. This can readily be seen from the formula for the distortion produced by a two-mirror system represented in Fig. 4a in vertical section:

$$\frac{a}{R} = (1 - 1/\beta^2)\frac{tg\alpha}{n}$$

wherein:

$a$ = distance between the screen and the two-mirror system, made as a glass prism with plane entrance and exit surfaces and cylindrical hypotenuse surfaces;
$R$ = radius of curvature of a horizontal line on the projection screen;
$\alpha$ = angle of incidence on the hypotenuse face of the prism;
$n$ = refractive index of the glass of the prism;
$\beta$ = anamorphotic factor of the two-mirror system.

Similarly the formula for the distortion of an anamorphotic optical system comprising two prisms, each of the type represented in Fig. 4a is:

$$\frac{a}{R} = (1 - 1/\beta_2^2)\frac{tg\alpha_2}{n_2} - 1/\beta_2^2(1 - 1/\beta_2^2)\frac{tg\alpha_1}{n_1}$$

The symbols used are the same as in the formula for a single prism, the indices 1 and 2 applying to the first and second prism respectively. It is clearly seen from this formula that the distortion can be given any required value by an appropriate choice of $\alpha_1$, $\alpha_2$, $\beta_1$, $\beta_2$, $n_1$ and $n_2$.

The same formula can be used also when the glass between the reflecting surfaces is removed. Then the refractive index $n_1$, and (or) $n_2$ becomes 1.

Figure 5A:
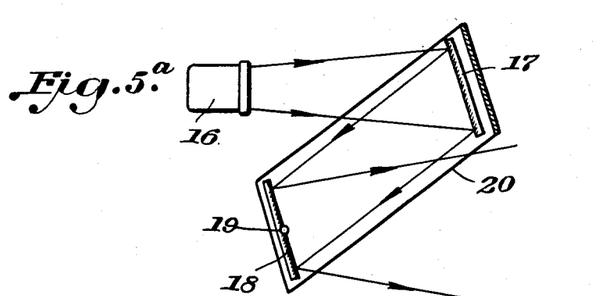
Fig. 5a is an open side view of a projection objective with a two mirror system.
Figures 5B, 6A:
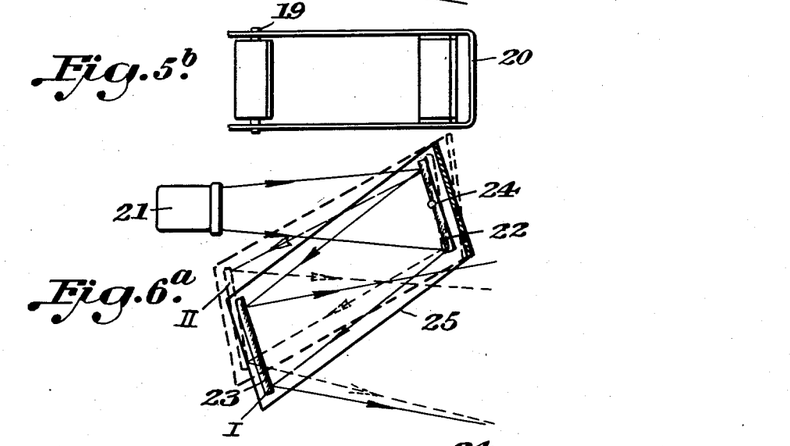
Figure 6B:
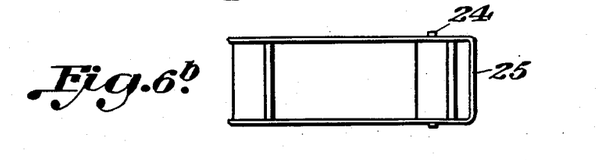

By way of example, two embodiments of the optical system with adjustable mirrors according to the invention are represented in Fig. 5 and Fig. 6.

Fig. 5a gives an open side view of a projection objective with a two mirror system. The plane of the drawing is again vertical.

Fig. 5b gives the bottom view of the latter system.

16 in Fig. 5a represents the projector objective. The optical system furthermore consists of the concave cylindrical mirror 17 and the convex cylindrical mirror 18. The latter is mounted so that it can rotate about a horizontal axis 19. Mirror 17 and the spindle representing axis 19 are mounted in a metal strap 20 which is bent U-shaped. Fig. 5b gives the bottom view of this metal strap together with the mirrors.

By rotation of mirror 18 about axis 19, the distortion, which curves the horizontal straight lines in such a way that they are convex in an upward direction, is influenced to a great extent, so that adjustment can be made at will to pronounced, moderate or slight distortion.

The system depicted in Figs. 6a and 6b is entirely analogous to that of Figs. 5a and 5b. Positioned in front of objective 21 are the concave cylindrical mirror 22 and the convex cylindrical mirror 23, which are mounted in the holder 25. In this embodiment, however, the mirrors are immovably fixed in holder 25 which can turn as a whole about horizontal axis 24. At the same time, the mirrors maintain the same position with respect to each other.

In both embodiments the whole system, consisting of a projector with its objective and the two cylindrical mirrors, is mounted so that it can rotate about a horizontal axis. This is, however, not shown in the drawing.

Although the systems described so far have already been well corrected, the under-correction for spherical aberration which is effected by the concave mirror is often too great to be fully corrected by the convex mirror; this is particularly the case in the embodiment represented in Fig. 1 in which the parallel axes of the two cylindrical mirrors are approximately (with a margin of about 20°) perpendicular to the optical axis of the objective.

The invention meets this objection by adding to the system a cylindrical or torric lens or lens system which affords over-correction.

An advantageous embodiment of this additional lens is a simple or compound meniscus lens, preferably of negative power. It is recommended that the meniscus be achromatized by being made in the form of a cemented or uncemented achromatic doublet.

The placing of the additional lens in the system may be effected in different ways; it may be positioned in the path of the beam between the objective and the first mirror, between the two mirrors or, if desired, after the second mirror.

The additional lens may be traversed once, twice or even three times. Traversal several times offers the advantage that the additional lens may be considerably weaker, viz., approximately as many times weaker as the number of times that the beams pass through the lens. The most preferable location for the cylindrical lens or cylindrical lens system as in the invention in any particular case, will depend upon circumstances, and the device in this respect can, within the scope of the invention, be made by anyone skilled in the art.

In a further embodiment of the system according to the invention, the concave mirror is obtained by providing the concave surface of the cylindrical meniscus or one of the concave surfaces of the cylindrical lens system with a reflecting layer. A variant is obtained by providing the convex surface of the meniscus lens with a reflecting layer, the lens being traversed at least twice by the beams. The advantages of this embodiment are: Firstly, that the concave mirror need not be made separately, and secondly, that the cylindrical meniscus lens is automatically adjusted with respect to the concave mirror.

The cylindric or toric lens can of course also be combined with the convex mirror, either as an alternative or in conjunction with a second lens of the additional lens system.

Figure 8:
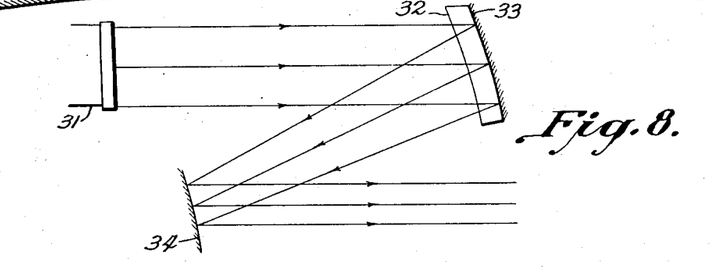
Fig. 8 is a diagrammatic view showing a further modification in which a meniscus lens is used.

An embodiment of the system according to the invention with a cylindrical meniscus lens, is shown by way of example in Fig. 8. The plane of the drawing is horizontal. Before objective 31 with focal length $f=75$ mm. relative aperture 1:1.9 of a 35 mm. film camera or projector, the arrangement comprises the concave cylindrical mirror 33 with a radius of curvature of 602 mm. and the convex cylindrical mirror 34 with a radius of curvature of 331 mm. The axes of these two mirrors are parallel to each other and are approximately perpendicular to the optical axis of objective 31. The term "approximately" is used in a wide sense, as one will apply an angle of 80° or even 70° instead of 90°, because, as has already been explained above, the distortion is influenced by this angle and hence the position of the cylinder axes is selected with a view to the amount of distortion desired. Mirror 33 is formed by the mirrored convex surface of the negative cylindrical meniscus lens whose concave surface 32 is cylindrical and has a radius of curvature of 500 mm. The thickness of this lens is 11 mm. and the glass of which the lens is made has an index of refraction of 1.52 and a dispersion number $v=60$.

The distance between the convex and the concave mirror surfaces 34 and 33 is 166 mm., measured along the chief ray of the beam shown in the drawing. The entire system has such an anamorphotic effect that the breadth of the beams in the horizontal plane of the drawing is reduced by a factor of 2 which means that the picture projected in the horizontal plane is widened by a factor of 2.

The meniscus lens 32, 33 is quite weak, as it is twice traversed by the beams. The effective power is therefore great enough to introduce an over-correction which will compensate the residual undercorrection of the system formed by the two mirrors 34 and 33. On the other hand, the lens is so weak that it does not introduce other aberrations to any troublesome extent.

Some variants on the system according to the invention as shown in Fig. 8 which have not been represented are the following:

(a) Surfaces 32 and 33 extend so far that the meniscus lens also receives the beams reflected at surface 34, so that this lens is traversed three times in all. In this case surface 33 is of course, not mirrored at the place where the third traversal occurs.

(b) Surface 34 is the mirrored convex or concave surface of a second meniscus lens which may be made of such a size that it receives the beams passing between objective 31 and surface 32. This second meniscus lens can also be used alone so that surface 32 is eliminated and only the concave mirror 33 remains.

(c) The cylindrical lens or the cylindrical lens system is mounted entirely or partly separate from mirrors 33 and 34 in the path of the rays between objective 31 and mirror 33, or between mirrors 33 and 34 or after mirror 34.

Fig. 9a represents an embodiment of the invention which is similar to that shown in Fig. 2, but gives in more detail the constructional features. The plane of the drawing is vertical.

The concave mirror 35 with radius 537 mm. and the convex mirror 36 with radius 269 mm. are mounted with their axes parallel to the plane of the drawing in the housing 37. The concave mirror is mounted on a disk 38 which bears the tube 39 with external screw thread corresponding to the internal thread of knob 40. The latter is provided with external thread and screwed into housing 37.

Figure 9:
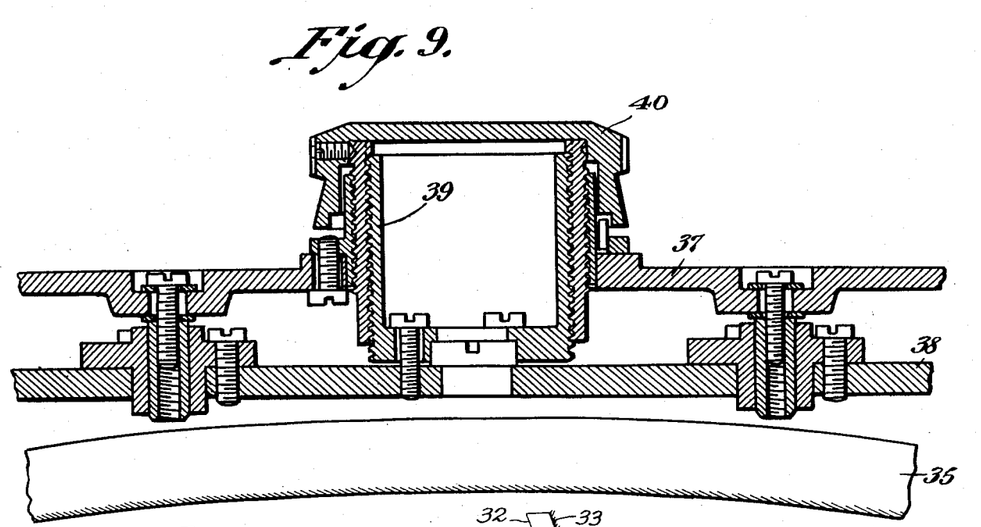
Fig. 9 is a cross sectional view of a detail of Fig. 9a, Fig. 9a is a cross sectional view showing a construction similar to that shown in Fig. 2.

As means are provided as shown in Fig. 9 so that concave mirror 35 can only be shifted in a direction perpendicular to its surface, whereas rotation about an axis, parallel to that direction is blocked, turning of knob 40 brings about a parallel shift of mirror 35 perpendicular to its surface. The threads are so chosen that knob 40 yields a relatively great shift of mirror 35.

The system can be used both for projection and photography and can be mounted on any suitable projector or camera which is currently available. The housing 37 can be fixed onto the camera or projector by means of a bolt which corresponds to the slide 41 which is represented both in Figs. 9a and 9b. Thus, the system is easily attachable and detachable, whilst the adjustment for correct height with respect to the object is also easily carried out.

Figure 10:
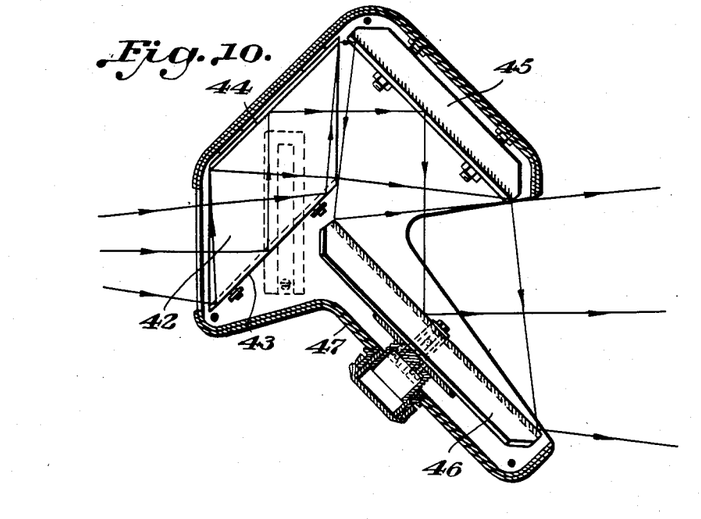

In Fig. 10 a further embodiment is represented. The system shown has nearly direct vision, the parallel shift of the beams amounting to only 3 cm.

The system comprises prism 42 with convex surface 43 which acts as a concave cylindrical mirror with axis in the plane of the drawing and radius 347 mm. The surface 44 is concave and acts as a convex mirror with axis parallel to that of surface 43 and radius 246 mm. Furthermore, the concave mirror 45 with radius 513 mm. and convex mirror 46 with radius 363 mm. are shown. The prism 42 and mirrors 45 and 46 are mounted in the housing 47. The parallel displacement of mirror 46 is effected in the same way as shown in Fig. 9a.

Figure 11:
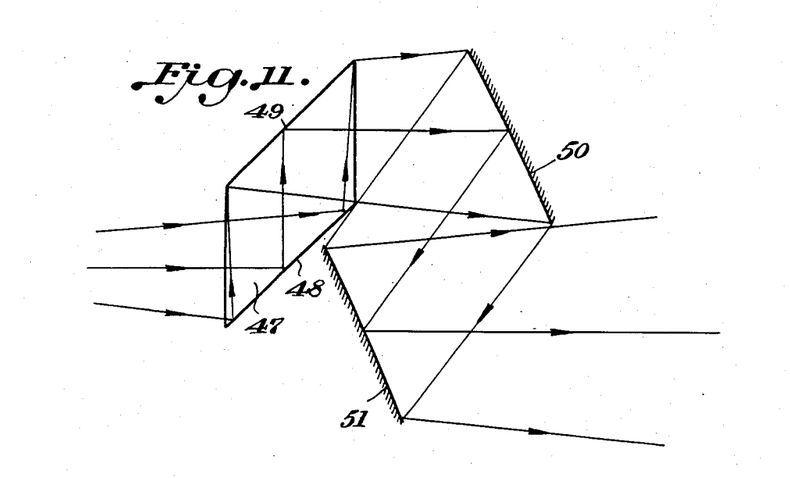
Fig. 11 is a diagrammatic view illustrating a still further modification wherein a prism is used with reflecting surfaces.

Furthermore in Fig. 11 an optical system is shown which comprises a prism 47 with reflecting surfaces 48 and 49 which is identical with the prism 42 in Fig. 10.

Mirror 50 is concave and torical, whereas mirror 51 is convex and torical. The radii of these mirrors are respectively 960 mm. and 840 mm. in the plane of the drawing and 760 mm. and 530 mm. in a plane perpendicular thereto. The mirrors 50 and 51 make an angle of approximately 27° with a vertical line in this example. The resulting advantages obtained are that the mirror 50 in the plane of the drawing has a converging effect on the beams between the two mirrors. Furthermore, the whole system can be smaller, not only because of the smaller last mirror 51 but also because of the fact that objectives of larger focal length can be used, as this anamorphotic system not only magnifies the projected image size in a horizontal direction (perpendicular to the plane of the drawing) but also in a vertical direction (in the plane of the drawing). Finally, the parallel shift of the beams can be smaller than in the case of purely cylindrical mirrors.

Figure 12:
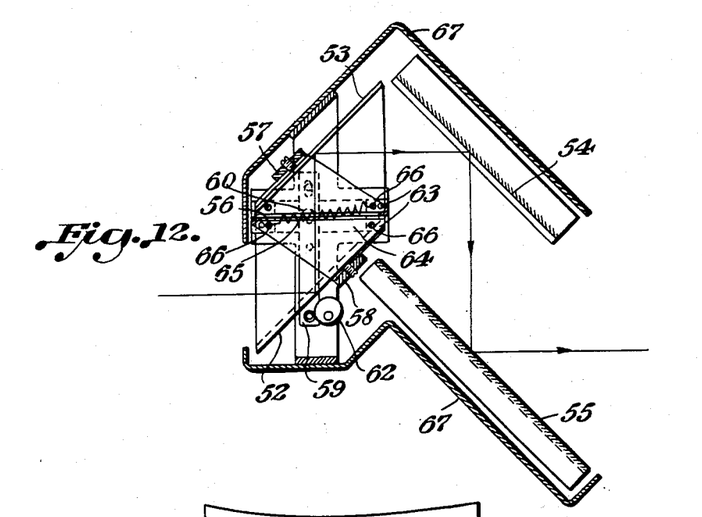
Fig. 12 is a cross sectional view and Fig. 12a is an enlarged left side view of another modification wherein a prism is used which is composed of two separate parts.
Figure 12A:
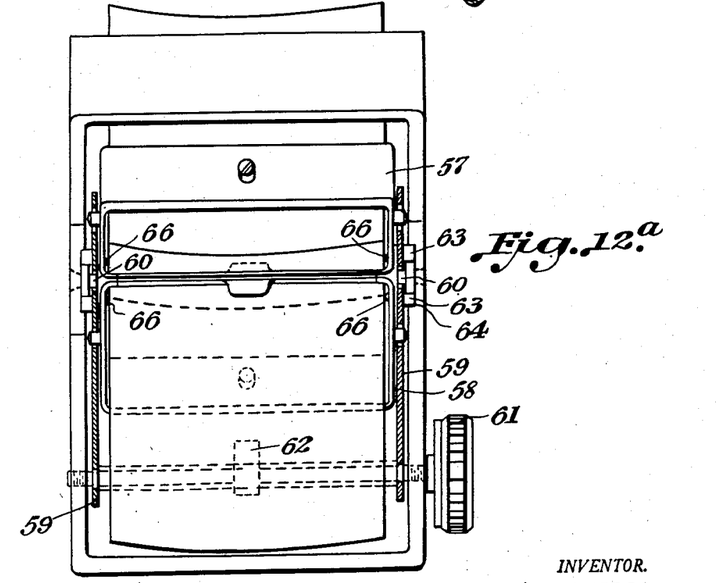

A further embodiment is represented in Fig. 12, wherein an optical system is shown which comprises a prism with the concave cylindrical mirror 52 (radius 324 mm.) and the convex cylindrical mirror 53 (radius 200 mm.), and furthermore the concave mirror 54 (radius 832 mm.) and the convex mirror 55 (radius 676 mm.). These four mirrors are arranged in the housing 67, which is only seen in the sectional view. The left-side view represents the optical system and the mountings thereof on an enlarged scale and without housing 67.

The prism is split up in two parts along plane 56 which is approximately perpendicular to the plane entrance and exit surfaces of the prism. Thus both parts can in the first place be translated along this plane and in a direction situated in the plane of the drawing. Such a translation yields an alteration in the distance of the surfaces 52 and 53 and consequently provides an easy and effective way to focus the anamorphotic system for various distances of object or screen. This translation for focussing is made possible by the mountings 57 and 58 of the prism parts, which can be shifted by means of the members 59 which are rotatable about points 60. The members 59 are operated by means of knob 61, provided with an excenter 62. The prism parts can only translate, as the blocks 63, fixed onto mountings 57 and 58, are guided in the slide 64. A spring 65 pressing the members 59 against excenter 62 eliminates any play. Adjustment of parallelism of the generatrices of the surfaces 52 and 53 is attained by means of the screws 66, permitting a mutual rotation of both prism parts in plane 56.

The splitting up of the prism in the manner described facilitates not only the adjustment and focussing but also the manufacturing of the prism itself, as parallelism of the generatrices is difficult to attain in a prism made of one single piece of glass.

The anamorphotic system represented in Fig. 12 produces only a small parallel shift of the light beams, viz. approximately 2 cm. The anamorphotic ratio is 2, so that the emergent beams have an elliptical cross-section, the two axes of the ellips differing a factor 2 in length.

There is a small residual distortion in order to compensate the natural distortion, which is present when projecting under an angle of 4° downwards. Thus the system can be used for projection angles of 0° (horizontal projection) up to 8°, without an appreciable distortion on the projection screen. The same applies mutatis mutandis when the system is used for photography.

Figure 13:
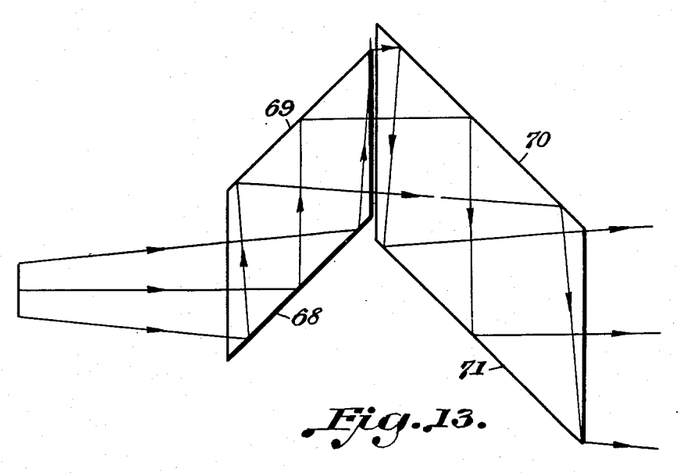
Fig. 13 is a diagrammatic view illustrating another modification wherein two prisms are used with reflecting surfaces.

Finally in Fig. 13 is represented schematically in cross-section an anamorphotic optical system in which two prisms are applied. The first prism forms the concave cylindrical mirror 68 with radius 369 mm. and the convex cylindrical mirror 69 with radius 246 mm. The second prism forms the concave cylindrical mirror 70 with radius 625 mm. and the convex cylindrical mirror with radius of 470 mm. The anamorphotic ratio amounts to 2 and the system is exactly free from distortion for a projection angle of 4° downwards.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. An optical reflecting anamorphosing device for use with an objective lens system and comprising a housing, means supporting a plurality of reflecting surfaces by said housing in operative alignment, at least one pair of said surfaces comprising a convex and a concave reflecting mirror surface with substantially parallel axes and being so positioned and dimensioned that a beam of light of circular cross-section incident on one of said surfaces is reflected to the other of said surfaces as a substantially parallel emergent beam of elliptical cross-section before leaving the device, said surfaces being positioned to have the shortest distance between their surfaces approximately equal to half the difference between the radii of the surfaces, and with the focal lines of the two surfaces approximately coincident and including at least one curved surface and with the axes of generation of said surfaces being substantially parallel to each other, entrance aperture means in said housing for admitting the light beam to said surfaces, whereby an object on one conjugate is compressed in a desired order on the other conjugate.

2. An optical reflecting anamorphosing device for use with an objective lens system and comprising a housing, means supporting a convex and a concave reflecting surface by said housing in operative alignment, at least one pair of said surfaces comprising a convex and a concave reflecting mirror surface with substantially parallel axes and being so positioned and dimensioned that a beam of light of circular cross-section incident on one of said surfaces is reflected to the other of said surfaces as a substantially parallel emergent beam of elliptical cross-section before leaving the device, the axes of generation of said surfaces being substantially parallel to each other, said surfaces being positioned to have the shortest distance between their surfaces approximately equal to half the difference between the radii of the surfaces, and with the focal lines of the two surfaces approximately coincident and the axes of the two surfaces situated substantially in the plane of the optical axis of the objective lens system and whereby an object on one conjugate is compressed in a desired order on the other conjugate.

3. An optical reflecting anamorphosing device as set forth in claim 2, said convex and concave reflecting surface being cylindrical.

4. An optical reflecting anamorphosing device as set forth in claim 3, the focal lines of said surfaces being approximately coincident.

5. An optical reflecting anamorphosing device as set forth in claim 2, said convex and concave reflecting surface being torical.

6. An optical reflecting anamorphosing device as set forth in claim 5, the focal lines of said surfaces being approximately coincident.

7. An optical reflecting anamorphosing device as set forth in claim 3, the axes of generation of said reflecting surfaces being so positioned that the sections of said surfaces with a plane perpendicular to said axes are asymmetrically arranged with respect to each other.

8. An optical reflecting anamorphosing device as set forth in claim 7, said reflecting surfaces being ground as opposite faces of a prism.

9. An optical reflecting anamorphosing device as set forth in claim 7, the angle of incidence of the chief ray of the light beam originating from the axial point of the object on said reflecting surfaces being smaller than 30°.

10. An optical reflecting anamorphosing device as set forth in claim 3, said axes of generation of said reflecting surfaces being so positioned that their sections with a plane perpendicular to said axes are symmertically arranged with respect to each other.

11. An optical reflecting anamorphosing device as set forth in claim 10, said reflecting surfaces being ground as opposite faces of a prism.

12. An optical reflecting anamorphosing device as set forth in claim 3, and an objective in optical alignment with said device, the optical axis of said objective being perpendicular to said axes of generation of said reflecting surfaces.

13. An optical reflecting anamorphosing device as set forth in claim 3, and an objective in optical alignment with said device, the optical axis of said objective being substantially located in the plane containing said axes of generation of said reflecting surfaces.

14. An optical reflecting anamorphosing device as set forth in claim 1, said reflecting surfaces including two plane surfaces for partly compensating the parallel horizontal or vertical shift of the emergent light beam as compared with the incident light beam.

15. An optical reflecting anamorphosing device as set forth in claim 3, said axes of generation of said reflecting surfaces being so positioned that their sections with a plane perpendicular to said axes are symmetrically arranged with respect to each other, and a second reflecting device associated with said first mentioned device.

16. An optical reflecting anamorphosing device as set forth in claim 15, at least two of said reflecting surfaces being ground on opposite faces of a prism.

17. An optical reflecting anamorphosing device as set forth in claim 2, at least one of said reflecting surfaces being adjustable with respect to the other.

18. An optical reflecting anamorphosing device as set forth in claim 2, said convex reflecting surface being mounted so that it can rotate about an axis which is approximately perpendicular to the plane in which are located said axes of generation of said reflecting surfaces.

19. An optical reflecting anamorphosing device as set forth in claim 2, said concave reflecting surface being mounted so that it can rotate about an axis which is approximately perpendicular to the plane in which are located said axes of generation of said reflecting surfaces.

20. An optical reflecting anamorphosing device as set forth in claim 3, and means added to said system for producing over-correction of spherical aberration.

21. An optical reflecting anamorphosing device as set forth in claim 20, said means including a cylindrical meniscus lens of negative power and with axes of generation substantially parallel to those of said reflecting surfaces, said meniscus lens being traversed at least once by the light beams.

22. An optical reflecting anamorphosing device as set forth in claim 3, said reflecting surfaces being spaced from one another approximately one-half the difference in radii of the curvature between them.

23. An optical reflecting anamorphosing device as set forth in claim 3, means for shifting one of said reflecting surfaces in a direction perpendicular to their surface, means for preventing rotation of said movable reflecting surface, a disc fixed to said movable reflecting surface, a threaded member upon said disc and means upon a rotatable knob coacting with said threaded means for moving said movable surface.

24. An optical reflecting anamorphosing device as set forth in claim 8, said prism being split up in two parts along a plane which is approximately perpendicular to the entrance and exit surfaces of said prism.

25. An optical reflecting anamorphosing device as set forth in claim 24, means being provided permitting a mutual translation and a rotation of said prism parts in said plane.

26. An optical reflecting anamorphosing device as set forth in claim 11, said prism being split up in two parts along a plane which is approximately perpendicular to the entrance and exit surfaces of said prism.

27. An optical reflecting anamorphosing device as set forth in claim 26, means being provided permitting a mutual translation and a rotation of said prism parts in said plane.

28. An optical reflecting anamorphosing device as set forth in claim 16, said prism being split up in two parts along a plane which is approximately perpendicular to the entrance and exit surfaces of said prism.

29. An optical reflecting anamorphosing device as set forth in claim 28, means being provided permitting a mutual translation and a rotation of said prism parts in said plane.

References Cited in the file of this patent

UNITED STATES PATENTS

| | | |
|---|---|---|
| 1,525,658 | Roach | Feb. 10, 1925 |
| 1,552,451 | Roach | Sept. 8, 1925 |
| 1,669,027 | Seymour | May 8, 1928 |
| 1,747,928 | Chesney | Feb. 18, 1930 |
| 1,785,347 | Herrschaft | Dec. 16, 1930 |
| 1,972,019 | Kanolt | Aug. 28, 1934 |
| 2,252,246 | Bergmans et al. | Aug. 12, 1941 |
| 2,296,943 | Okolicsanyi | Sept. 29, 1942 |
| 2,628,533 | Oetjen | Feb. 17, 1953 |

FOREIGN PATENTS

| | | |
|---|---|---|
| 488,391 | Germany | Jan. 8, 1930 |
| 354,843 | Great Britain | Aug. 17, 1931 |